United States Patent [19] [11] 3,868,418
Herrmann et al. [45] Feb. 25, 1975

[54] NOVEL N-(ORTHO- AND PARA-NITROBENZOYL)-SULFOXIMINE INTERMEDIATES AND PROCESS FOR THEIR PRODUCTION

[75] Inventors: Wolfgang Dieter Herrmann, Denzlingen; Peter Johannes Stoss, Wildtal; Gerhard Saltzinger, Denzlingen, all of Germany

[73] Assignee: Warner-Lambert Company, Morris Plains, N.J.

[22] Filed: Apr. 13, 1973

[21] Appl. No.: 351,112

[52] U.S. Cl. ........ 260/558 S, 260/482 C, 260/551 S
[51] Int. Cl. ......................................... C07c 103/30
[58] Field of Search ...................... 260/558, 551, 77

Primary Examiner—Harry I. Moatz
Attorney, Agent, or Firm—Albert H. Graddis; Frank S. Chow; Anne M. Kelly

[57] ABSTRACT

Novel intermediates having the general formula I:

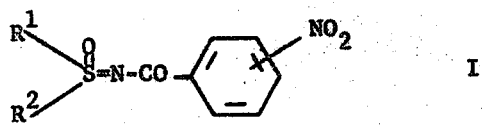

wherein $R^1$ and $R^2$ each represent an aliphatic radical having from 1 to 3 carbon atoms, a phenyl radical or a monosubstituted phenyl radical, are produced by reacting a sulfoxide having the formula II:

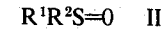

$$R^1R^2S=O \quad II$$

wherein $R^1$ and $R^2$ are as described above, with an O-acylnitrobenzhydroxamic acid of the general formula III:

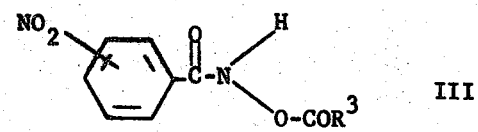

wherein $R^3$ represents methyl or ethyl. The above novel process is safe and easy to run without the usual precautions against spontaneous explosions required in prior art sulfoximine preparations. The novel N-(ortho- and para-nitrobenzoyl)-sulfoximines of formula I may be hydrolyzed, under either acid or alkaline conditions to obtain free sulfoximines of the formula IV:

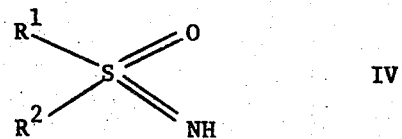

wherein $R^1$ and $R^2$ are as described above. The novel sulfoximines of this invention having formula I and the free sulfoximines having formula IV, produced by the novel process of this invention are useful as intermediates in the preparation of known, pharmacologically active N-substituted aminoalkyl-S,S-diphenylsulfoximines.

7 Claims, 2 Drawing Figures

NOVEL N-(ORTHO- AND PARA-NITROBENZOYL)-SULFOXIMINE INTERMEDIATES AND PROCESS FOR THEIR PRODUCTION

SUMMARY OF THE INVENTION

This invention relates to novel intermediates having the general formula I:

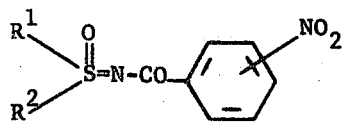

wherein $R^1$ and $R^2$ represent an aliphatic radical having from 1 to 3 carbon atoms, a phenyl radical, or a monosubstituted phenyl radical, and to a simple, safe process for producing intermediates I by reacting a sulfoxide having the formula II:

$$R^1R^2 S=O \qquad II$$

wherein $R^1$ and $R^2$ are as described above, with an O-acylnitrobenzhydroxamic acid of the general formula III:

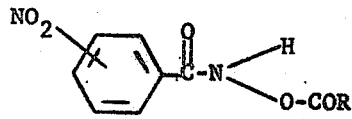

wherein $R^3$ represents methyl or ethyl. The N-(ortho- and paranitrobenzoyl)-sulfoximines of formula I may be hydrolyzed, under either acid or alkaline conditions to obtain free sulfoximines of the formula IV:

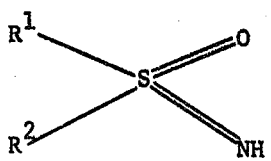

wherein $R^1$ and $R^2$ are as described above. The novel sulfoximines of this invention having formula I and the free sulfoximines having formula IV produced by the novel process of this invention are useful as intermediates in the preparation of known, pharmacologically active N-substituted aminoalkyl-S,S-diphenylsulfoximines.

BRIEF DESCRIPTION OF THE DRAWINGS

FIG. I is a schematic representation of the process of this invention wherein the N-(ortho- and para-nitrobenzoyl) sulfoximine intermediates are prepared by the reaction of a sulfoxide with an O-acylnitrobenzhydroxamic acid.

FIG. II is a schematic representation of the hydrolysis of the novel O-acylnitrobenzhydroxamic acids of the invention to the free sulfoximine derivative.

DETAILED DESCRIPTION OF THE INVENTION

Figure 1:
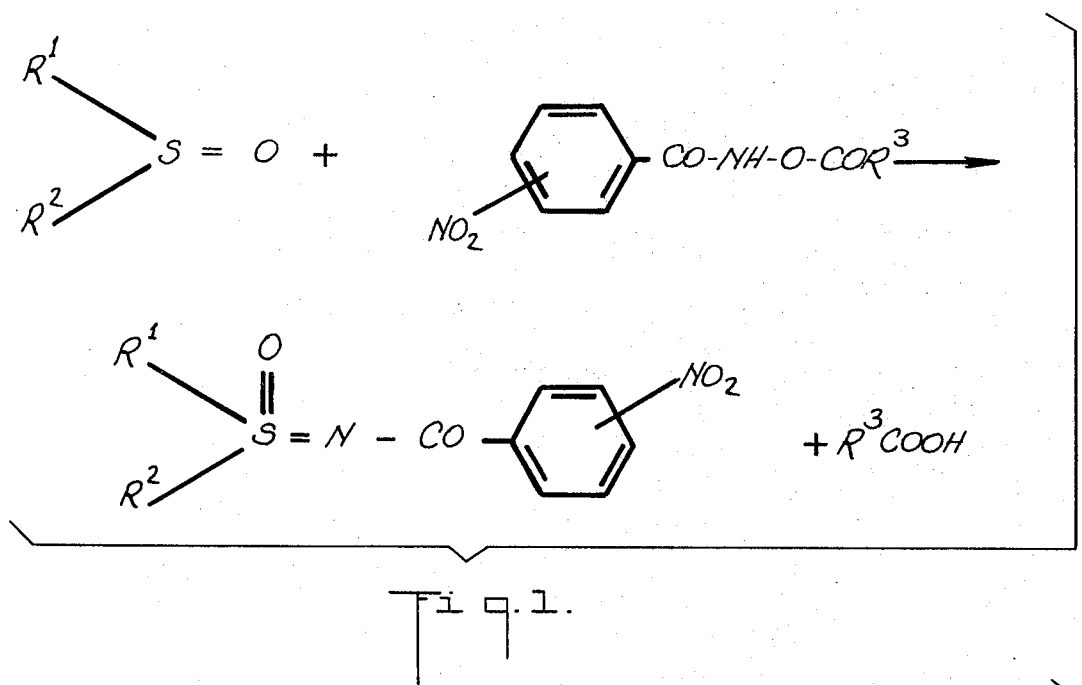
Figure 2:
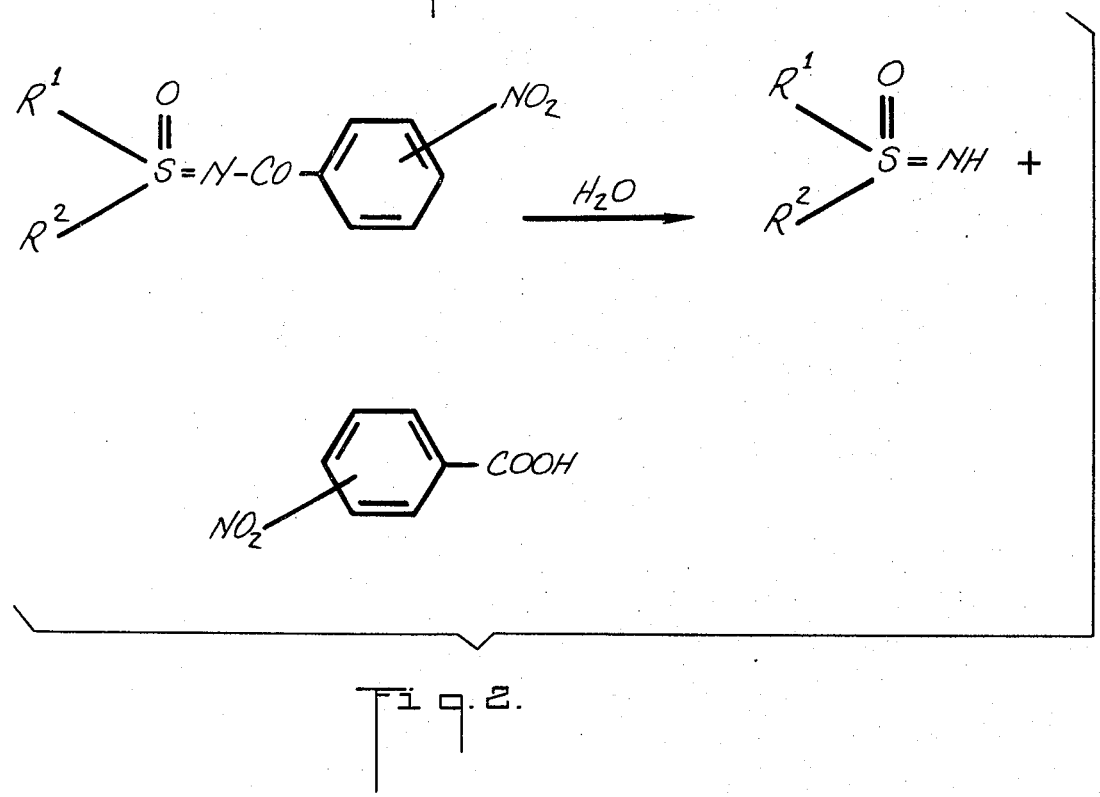

Sulfoximines of the general type prepared by the novel process of this invention were not discovered until 1949 (H.R. Bently and collaborators, Nature 164, 438 (1949)). Recently, a number of papers dealing with the synthesis, the mode of reaction and the structure of the sulfoximines, have appeared. In addition, interesting pharmacological properties of some sulfoximines have also been described, as for example, in U.S. Pat. No. 3,637,664, where N-substituted aminoalkyl-S,S-diphenylsulfoximines are described as exhibiting broncholyticantispasmodic activity.

The laboratory method generally adopted for the preparation of the subject sulfoximines consists in the thermal or photolytic decomposition of hydrazoic acid produced in situ, or the decomposition of organic azides, in the presence of sulfoxides. During such preparations, the tendency of the hydrazoic acid and of the azides to decompose explosively on contact or when struck or heated compels the utilization of extensive safety measures during this reaction. Even with the necessary precautions, spontaneous explosions occur repeatedly when these compounds are handled. The potential danger of this reaction to the production facilities and to personnel engaged in the preparation of these compounds has, heretofore, made semiindustrial or technical use of the sulfoximine products undesirable in most respects.

The present invention relates to a novel, simple process for the production of N-substituted sulfoximines, which can be utilized safely on an industrial scale, without risk to apparatus or personnel. Additionally, the present invention relates to several novel compounds prepared according to the novel process as well as to a process for simple transformation of these novel N-substituted sulfoximines into the free sulfoximines, which can be in turn utilized to prepare known, pharmacologically active N-substituted sulfoximines.

The process according to the invention for the production of novel N-substituted sulfoximines consists in reacting sulfoxides having the formula II:

$$R^1R^2S=O \qquad II$$

wherein $R^1$ and $R^2$ each represent an aliphatic radical having from 1 to 3 carbon atoms, a phenyl radical or a monosubstituted phenyl radical, with o-acyl derivatives of ortho- and paranitrobenzhydroxamic acid having the formula III:

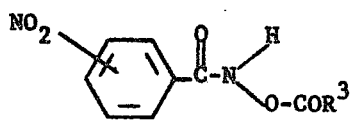

wherein $R^3$ represents methyl or ethyl, according to the reaction scheme illustrated in FIG. I of the drawings. In this connection $R^1$ and $R^2$ may be alkyl groups with 1–3 C-atoms, phenyl radicals or monosubstituted phenyl radicals; $R^3$ represents methyl or ethyl.

The N-nitrobenzoyl sulfoximines III obtained can be hydrolysed under both acid and alkaline conditions according to the invention to form the free sulfoximines having the formula IV, wherein the S=N— bond is maintained. This reaction is illustrated in FIG. II of the drawings.

The free sulfoximines IV obtained can be used as intermediate products for the preparation of other N-substituted sulfoximines, that is, the N-substituted aminoalkyl-S,S-diphenylsulfoximines described in U.S.

Pat. No. 3,637,664. These last mentioned sulfoximines of U.S. Pat. No. 3,637,664 exhibit broncholyticantispasmodic activity and are useful in treating conditions generally associated with bronchial diseases.

The sulfoxides used as the starting substances for the process of this invention can either be commercially obtained or can be prepared according to generally known methods. Nitrobenzhydroxamic acids are obtained from nitrobenzoic acid derivatives and hydroxylamine; the o-acyl-compounds can be prepared by reaction of hydroxamic acids with acid halides or acid anhydrides.

The reaction of a sulfoxide and a hydroxamic acid ester according to the invention is carried out in the melt preferably, but it is also possible to perform this step in a solvent. The reaction temperature and heating time depend upon the individual components and the properties thereof, above all upon their melting points. Thus, the reaction temperatures range from about 70°C to 200°C; the reaction times are about one or more hours, again depending upon reactants. When using high boiling sulfoxides, it is preferable to provide a vacuum; the acetic acid or propionic acid forming in the course of the reaction thus distills off. Upon completion of the reaction, the reaction mixture is allowed to cool, and a solvent is added in which the corresponding sulfoximines are sparingly soluble, while providing utmost solubility for the impurities. For example lower alcohols or ethyl acetate are used. The corresponding sulfoximines are isolated by means of suction or centrifuging, and possibly purified by recrystallization.

The N-acyl sulfoximines obtained by the process of this invention surprisingly can be hydrolysed very easily, the S=N bond being retained. Hydrolysis can be performed with mineral acids or with aqueous or alcoholic alkali. Preferably 10% methanolic KOH is used, with a heating time of 30–60 minutes sufficing for completing the hydrolysis. For isolating the free sulfoximines, the reaction mixture is diluted with water and the sulfoximine bases are extracted by means of a solvent immiscible with water. After having distilled off the solvent, the sulfoximines are left in the form of a residue; for purification, either a sparingly soluble salt is produced, such as the hydrochloride, by introducing HCl gas into the solution of the corresponding sulfoximine base in ethyl acetate, or the sulfoximine base is distilled or recrystallized.

Hydrolysis of the N-acyl sulfoximines can also be performed without isolation, directly after reaction of the sulfoxide with the nitrobenzhydroxamic acid ester, in the same reaction vessel.

In order to further illustrate this invention, the following examples are given:

EXAMPLE 1

405 g (2 moles) of diphenyl sulfoxide and 493 g (2.2 moles) of O-acetyl-p-nitrobenzhydroxamic acid are mixed, transferred into a three-necked flask and melted in the oil bath while stirring. Subsequently a water jet vacuum is provided and the melt heated for 6 hours to 130°C–140°C of oil bath temperature, while stirring. The principal amount of the acetic acid formed thus distils off. Upon completion of the reaction the mixture is allowed to cool to 60°C–70°C, and 5 liters of isopropyl alcohol are added. The N-(p-nitrobenzoyl)-diphenylsulfoximine crystallizes out on standing and further cooling; it is sucked off and washed. The yield amounts of 535 g (73% of theory). N-(p-nitrobenzoyl)-S,S-diphenyl sulfoximine forms colorless crystals, M.P. 161°C.

EXAMPLE 2

22.4 g (0.1 mole) of O-acetyl-p-nitrobenzhydroxamic acid are dissolved in 150 ml of dimethyl sulfoxide, and the solution is heated in the oil-bath to 90°C–100°C for 15 hours. Subsequently 300 ml of water are added. On cooling, 22 g (91% of theory) of N-(p-nitrobenzoyl)-S,S-dimethylsulfoximine crystallize out. Colorless crystals, M. P. of 190°C, form.

EXAMPLE 3

24.6 g (0.11 mole) of O-acetyl-p-nitrobenzhydroxamic acid are heated with 14 g (0.1 mole) of methyl-phenyl-sulfoxide to 130°C–140°C for 6 hours, while stirring.

Upon completion of the reaction the mixture is heated with 250 ml of isopropanol, the solution treated with coal and cooled. 13.6 g (45% of theory) of N-(p-nitrobenzoyl)-S-phenyl-S-methyl-sulfoximine crystallize out.

The substance melts at 144°C.

EXAMPLE 4

23.8 g (0.1 mole) of O-propionyl-p-nitrobenzhydroxamic acid and 20.2 g (0.1 mole) of diphenylsulfoxide are heated in the oil bath to 135°C–140°C for 12 hours, while stirring. The cooled reaction mixture is boiled up with 250 ml of isopropanol. On cooling and standing, N-(p-nitro-benzoyl)-S,S-diphenylsulfoximine crystallizes out.

The yield amounts to 14.5 g (40% of theory).

EXAMPLE 5

366 g (1 mole) of N-(p-nitrobenzoyl)-S,S-diphenyl-sulfoximine are heated to reflux for 1 hour in 3 liters of 10% methanolic KOH. Subsequently the principal amount of methanol is distilled off, and 5 liters of water are added to the residue. The diphenyl sulfoximine is extracted with dichloromethane, the organic phase is dried, and the solvent distilled off. The remaining residue is taken up in 800 ml of ethyl acetate and the hydrochloride precipitated by means of ethyl acetate/HCl. The yield amounts to 219 g (86% of theory). Diphenyl sulfoximine hydrochloride forms colorless crystals, M.P. 238°C – 240°C.

EXAMPLE 6

As in Example 1, 405 g (2 moles) of diphenyl sulfoxide are reacted with 493 g (2.2 moles) of O-acetyl-p-nitrobenzhydroxamic acid at 130°C–140°C. Upon completion of the reaction the N-acyl compound is hydrolysed directly (according to Example 5): 3 liters of 10% methanolic KOH are added and the mixture heated under reflux for 1 hour. The principal amount of the methanol is removed, 6 liters of water are added, and the mixture is extracted with dichloromethane.

The residue of the dichloromethane phase is taken up in ethyl acetate and the diphenyl sulfoximine hydrochloride precipitated by means of ethyl acetate/HCl.

The yield amounts of 342 g (68% of theory).

EXAMPLE 7

24.6 g (0.11 mole) of O-acetyl-p-nitrobenzhydroxamic acid are heated for 5 hours with 26.2 g (0.1 mole)

of Di-(p-methoxyphenyl)-sulfoxide to 120°C, while stirring. Upon completion of the reaction 150 ml of 10% methanolic KOH are added and the mixture is boiled under reflux for 1 hour. After having distilled off the principal amount of the methanol, the residue is introduced into water, and the sulfoximine extracted with dichloromethane. The residue left after having distilled off the solvent is taken up in ethyl acetate and the hydrochloride of the S,S-Di-(p-methoxyphenyl)-sulfoximine precipitated with hydrogen chloride.

The yield amounted to 8.5 g (27% of theory).

S,S-Di-(p-methoxyphenyl)-sulfoximine-hydrochloride melts at 200°C, the corresponding free base at 135°C–137°C.

EXAMPLE 8

24.6 g (0.11 mole) of O-acetyl-o-nitrobenzhydroxamic acid are heated with 20.2 g (0.1 mole) of diphenyl sulfoxide to 135°C in the oil bath for 8 hours, while stirring. Then hydrolysation is performed as described in Example 6, and the hydrochloride of the diphenyl sulfoximine precipitated. The yield amounts to 4.3 g (17% of theory).

What is claimed is:

1. A compound of the formula I:

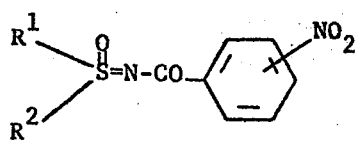

I wherein $R^1$ and $R^2$ each represent an alkyl radical having from 1 to 3 carbon atoms, a phenyl radical or a para-methoxy phenyl radical.

2. A compound according to claim 1 wherein $R^1$ and $R^2$ each represent methyl, phenyl, or para-methoxyphenyl.

3. A compound according to claim 1 which is N-(paranitrobenzoyl)-S,S-diphenylsulfoximine.

4. A compound according to claim 1 which is N-(paranitrobenzoyl)-S,S-dimethylsulfoximine.

5. A compound according to claim 1 which is N-(paranitrobenzoyl)-S-phenyl-S-methyl-sulfoximine.

6. A compound according to claim 1 which is N-(paranitrobenzoyl)-S,S-di(para-methoxyphenyl)-sulfoximine.

7. The process for the production of an N-(ortho- and para-nitrobenzoyl)-sulfoximine having the formula I:

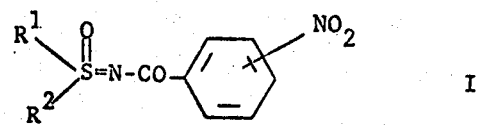

I wherein $R^1$ and $R^2$ each represent an alkyl radical having from 1 to 3 carbon atoms, a phenyl radical or a para-methoxy phenyl radical which comprises reacting at a temperature of from about 70°C to about 200°C, a sulfoxide having the formula II:

$$R^1R^2S=O \qquad II$$

wherein $R^1$ and $R^2$ are as described above, with an O-acylnitrobenzhydroxamic acid of the formula III:

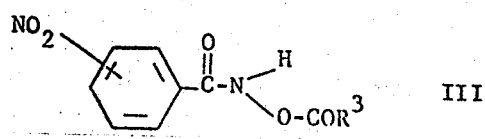

III wherein $R^3$ represents methyl or ethyl.

* * * * *

UNITED STATES PATENT OFFICE
CERTIFICATE OF CORRECTION

PATENT NO. : 3,868,418
DATED : February 25, 1975
INVENTOR(S) : Wolfgang Dieter Herrmann et al.

It is certified that error appears in the above-identified patent and that said Letters Patent are hereby corrected as shown below:

Title page, Column 1 after "[21] Appln. No. 351,112" insert

--- [30]   Foreign Application Priority Data

April 25, 1972   West Germany............P 22 20 256.8---.

Title page, cancel the drawing.

Signed and Sealed this second Day of September 1975

[SEAL]

Attest:

RUTH C. MASON
Attesting Officer

C. MARSHALL DANN
Commissioner of Patents and Trademarks